(12) United States Patent
Sugimoto et al.

(10) Patent No.: US 11,000,924 B2
(45) Date of Patent: May 11, 2021

(54) HEAT TREATMENT METHOD AND ASSEMBLY METHOD FOR FITTED COMPONENT (71) Applicant: NISSAN MOTOR CO., LTD., Yokohama (JP)

(72) Inventors: Tsuyoshi Sugimoto, Kanagawa (JP); Ryosuke Hiraishi, Kanagawa (JP); Kenji Yasui, Kanagawa (JP); Yukichi Okayama, Kanagawa (JP); Kei Tanaka, Kanagawa (JP); Takeshi Oshio, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/811,066

(22) Filed: Mar. 6, 2020

(65) Prior Publication Data
US 2020/0206850 A1 Jul. 2, 2020

Related U.S. Application Data (63) Continuation of application No. 16/333,470, filed as application No. PCT/JP2016/077421 on Sep. 16, 2016, now abandoned.

(51) Int. Cl.
*B23P 11/02* (2006.01)
*F16D 1/08* (2006.01)
(Continued)

(52) U.S. Cl.
CPC .............. *B23P 11/025* (2013.01); *B23P 11/02* (2013.01); *F16B 4/008* (2013.01); *F16D 1/027* (2013.01);
(Continued)

(58) Field of Classification Search
CPC ........ B23P 11/02; B23P 11/025; F16D 1/0858; F16D 1/027; F16B 4/008; C21D 1/18;
(Continued)

(56) References Cited

U.S. PATENT DOCUMENTS

| 2002/0062866 A1 | 5/2002 | Sumiya et al. |
| 2007/0102471 A1 | 5/2007 | Gross et al. |

(Continued)

FOREIGN PATENT DOCUMENTS

| DE | 41 33 607 A1 | 5/1992 |
| DE | 10 2007 024 091 A1 | 11/2008 |

(Continued)

*Primary Examiner* — Moshe Wilensky
(74) *Attorney, Agent, or Firm* — Foley & Lardner LLP (57) ABSTRACT A heat treatment method is provided in which a first steel component (11) formed with a coating (111) thereon is fitted in first holes (123, 124) of a second steel component (12) subjected to a quenching treatment. The heat treatment method includes a heating step of heating the second steel component to a first temperature ($T_1$) equal to or higher than a tempering temperature ($T_0$) of the second steel component and higher than a temperature of the first steel component by a temperature difference ($\Delta T$) for achieving shrink fitting and a shrink-fitting step of shrink-fitting the first steel component in the first holes of the second steel component in a state of maintaining the temperature difference for achieving shrink fitting between the first steel component and the second steel component.

10 Claims, 8 Drawing Sheets

(51) Int. Cl.
*F16D 1/027* (2006.01)
*F16B 4/00* (2006.01)
*C21D 1/18* (2006.01)

(52) U.S. Cl.
CPC ............ *F16D 1/0858* (2013.01); *C21D 1/18* (2013.01); *C21D 2211/001* (2013.01); *C21D 2211/008* (2013.01)

(58) Field of Classification Search
CPC ......... C21D 2211/001; C21D 2211/008; F16C 11/02; F16C 11/045; F16C 2206/04
See application file for complete search history.

(56) References Cited

U.S. PATENT DOCUMENTS

| | | |
|---|---|---|
| 2012/0125695 A1 | 5/2012 | Vempati et al. |
| 2015/0144826 A1 | 5/2015 | Bayyouk et al. |
| 2015/0184788 A1 | 7/2015 | Hesjevik et al. |
| 2016/0281865 A1 | 9/2016 | Morgan et al. |

FOREIGN PATENT DOCUMENTS

| | | |
|---|---|---|
| EP | 2 677 227 A1 | 12/2013 |
| JP | 63-185536 A | 8/1988 |
| JP | 64-034614 A | 2/1989 |
| JP | 2002-161826 A | 6/2002 |
| JP | 2004-090130 A | 3/2004 |
| JP | 3791591 B2 | 6/2006 |
| JP | 2015-150627 A | 8/2015 |

Example

Comparative Example

HEAT TREATMENT METHOD AND ASSEMBLY METHOD FOR FITTED COMPONENT

This application is a continuation of application Ser. No. 16/333,470, filed Mar. 14, 2019, which is the U. S. national phase of International Application No. PCT/JP2016/077421 filed Sep. 16, 2016, which designated the U. S., the entire contents are hereby incorporated by reference.

TECHNICAL FIELD

The present invention relates to a heat treatment method and an assembly method for a fitted component.

BACKGROUND ART

In a conventional technique of press-fitting a stainless steel adjust pipe of a fuel injection valve into a stainless steel stator iron core, it has been known that a chemical conversion coating having lubricity is formed on each of the inner and outer circumferential surfaces of the adjust pipe to reduce the variation in the press-fitting load (Patent Document 1: JP3791591B).

Patent Document 1: JP3791591B

SUMMARY OF INVENTION

However, when a component formed with a coating thereon as in the above conventional technique is press-fitted into a hole of a steel material that is hardened by quenching, the coating may delaminate from the component. The lubricative chemical conversion coating of the above conventional technique achieves its purpose at the time of press-fitting, so the delamination may not be problematic, but if the coating applied to a press-fitted component functions after the press fitting, the delamination may be problematic.

A problem to be solved by the present invention is to provide a heat treatment method and an assembly method for a fitted component with which when a component formed with a coating thereon is fitted in a quenched component, delamination of the coating can be suppressed.

The present invention solves the above problem in the following manner. When a first steel component formed with a coating thereon is fitted in a first hole of a second steel component subjected to a quenching treatment, the second steel component is heated to a first temperature equal to or higher than a tempering temperature of the second steel component and equal to or higher than a temperature of the first steel component by a temperature difference for achieving shrink fitting, and the first steel component is shrink-fitted in the first hole of the second steel component in a state of maintaining a temperature difference for achieving shrink fitting between the first steel component and the second steel component.

According to the present invention, the first steel component is shrink-fitted in the first hole of the second steel component in a state of maintaining the temperature difference for achieving the shrink fitting between the first steel component and the second steel component and it is therefore possible to suppress the delamination of the coating formed on the first steel component. In addition to this, the tempering treatment can be performed without providing a dedicated tempering step because, for the shrink fitting, the second steel component is heated to a temperature equal to or higher than the tempering temperature.

MODE(S) FOR CARRYING OUT THE INVENTION

Hereinafter, one or more embodiments of the present invention will be described with reference to the drawings. According to a first aspect, the present invention provides a heat treatment method for a fitted component, and according to a second aspect, the present invention provides an assembly method for a fitted component. In the following embodiment, the present invention will be described as a heat treatment method for a fitted component, but this embodiment is also applicable to an assembly method for a fitted component.

Figure 2A:
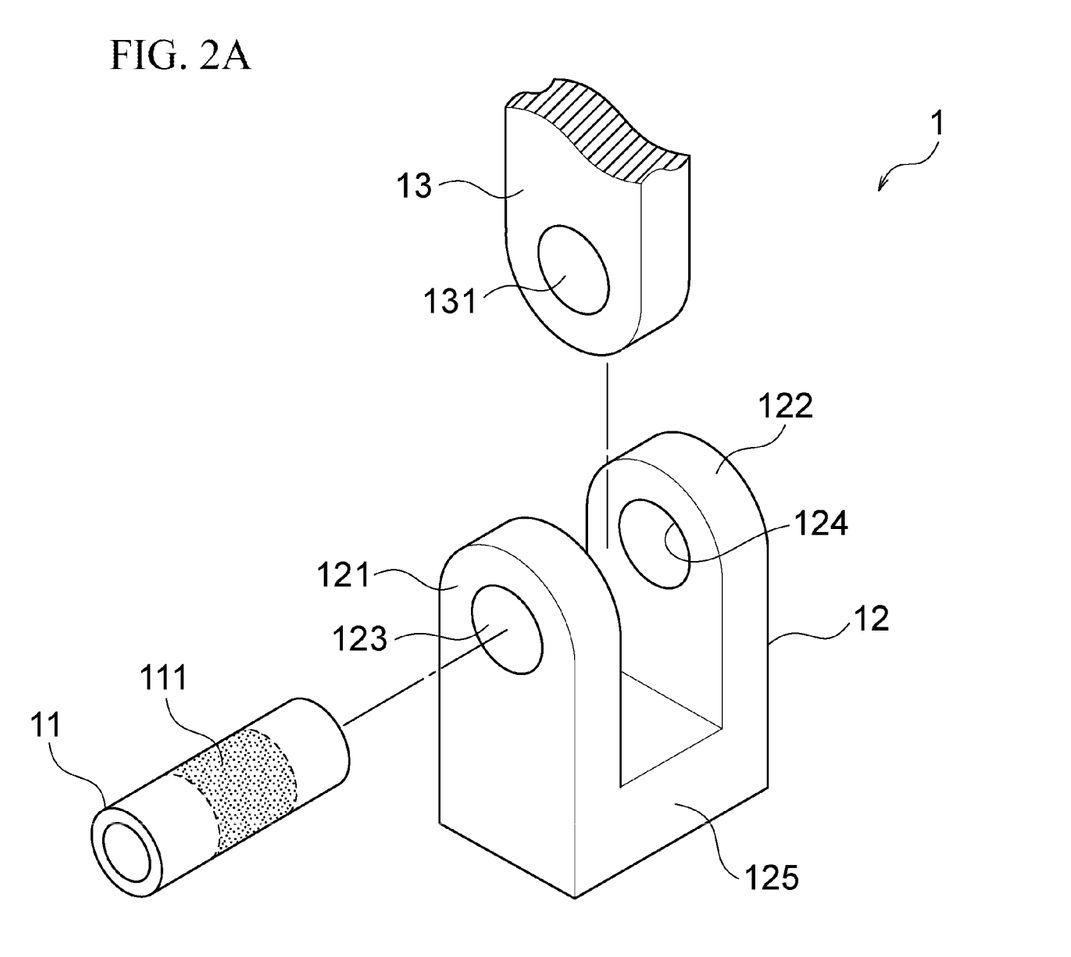
FIG. 2A is a perspective view (before assembly) illustrating an embodiment of a fitted component according to the present invention.
Figure 2B:
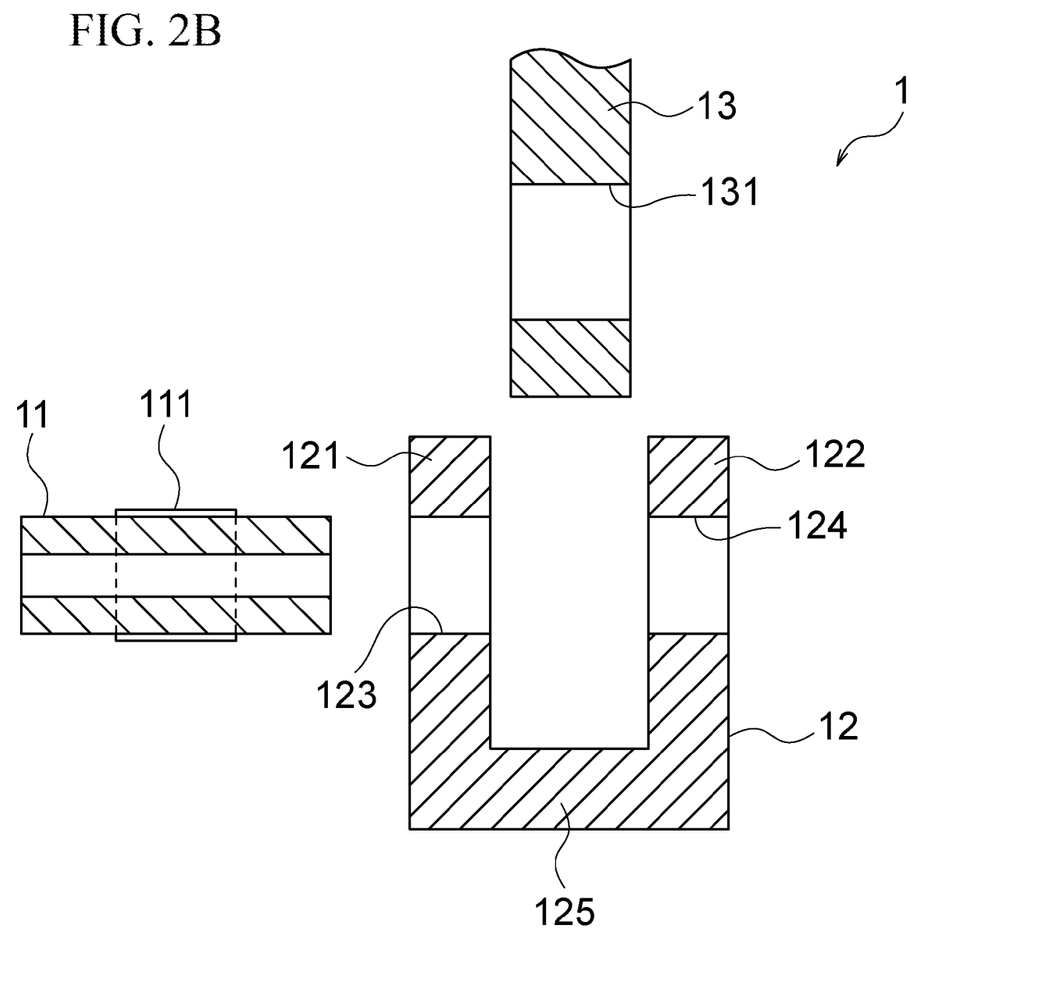
FIG. 2B is a central cross-sectional view (before assembly) illustrating an embodiment of the fitted component according to the present invention.
Figure 2C:
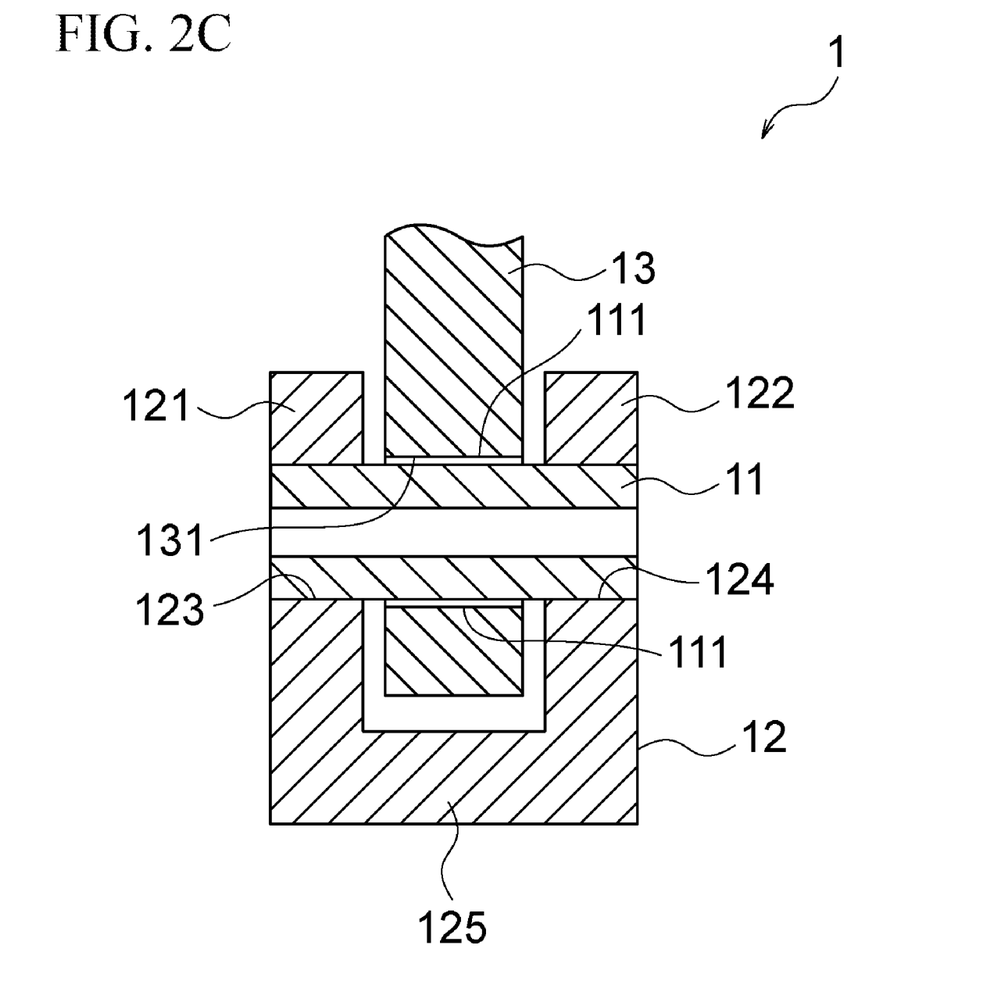
FIG. 2C is a central cross-sectional view (after assembly) illustrating an embodiment of the fitted component according to the present invention.

FIG. 2A is a perspective view (before assembly) illustrating an embodiment of a fitted component according to the present invention, FIG. 2B is a central cross-sectional view of the same (before assembly), and FIG. 2C is a central cross-sectional view of the same (after assembly). As illustrated in FIGS. 2A to 2C, the fitted component as an object of the heat treatment method or assembly method in the present embodiment comprises at least a first steel component 11, a second steel component 12, and a third component 13. It should be noted, however, that the third component is not an essential component in the fitted component according to the present invention.

The first steel component 11 is a hollow steel component (or may also be a solid steel component). To reduce the sliding resistance, for example, the first steel component 11 is formed with a coating 111, such as a diamond-like carbon film (DLC film), within an area of the outer surface to be in sliding contact with a second hole 131 of the third component 13. As illustrated in FIGS. 2B and 2C, the first steel component 11 is fitted in a pair of first holes 123 and 124 of the second steel component 12 by shrink fitting and inserted in the second hole 131 of the third component.

The second steel component 12 comprises a base part 125 and a pair of wall parts 121 and 122 that are provided to stand from the base part 125 so as to have a certain space between the wall parts 121 and 122. The wall parts 121 and 122 are respectively formed with the first holes 123 and 124 in which the first steel component 11 is to be fitted. The outer diameter dimension of the first steel component 11 and the inner diameter dimension of the first holes are processed to predetermined fitting dimensions. One end part of the third component 13 is inserted between the wall parts 121 and 122. In this state, the first steel component 11 is inserted in the second hole 131 and fitted in the first holes 123 and 124, and the third component 13 is thereby pivotably supported with respect to the second steel component 12.

One end part of the third component 13 is formed with the second hole in which the first steel component 11 is inserted. Thus, the first steel component 11, the second steel component, and the third component 13 are assembled to constitute a machine element such as a link.

Figure 1:
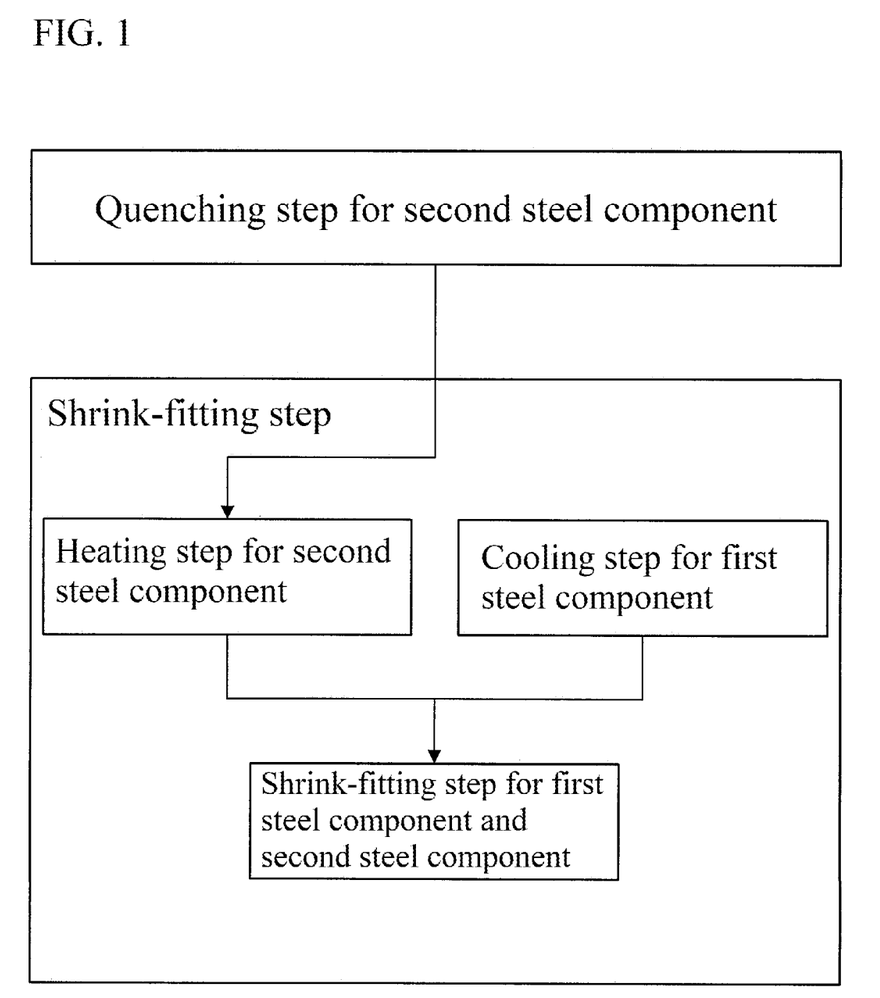
FIG. 1 is a process flow diagram illustrating an embodiment of a heat treatment method and an assembly method for a fitted component according to the present invention.

As illustrated in FIG. 1, before these fitting components 11, 12, and 13 are assembled, the second steel component 12 is subjected to a quenching treatment. That is, to enhance the wear resistance of the second steel component 12 by hardening its component surface, the quenching treatment is performed which includes heating the second steel component 12 to a temperature at which the metal structure of the component surface becomes an austenite structure and then rapidly cooling it thereby to generate a hard and dense α-martensite structure.

Then, the first steel component 11 is fitted in the first holes 123 and 124 of the second steel component 12. Here, the surface of the second steel component 12 including the first holes 123 and 124 is hardened because the second steel component 12 has been subjected to the quenching treatment. If, in this state, the first steel component 11 is press-fitted into the first holes 123 and 124 of the second steel component 12, the coating 111 such as DLC formed on the surface of the first steel component 11 is highly likely to delaminate. Moreover, if a chemical conversion coating having lubricity is formed for the press fitting as in the cited conventional technique, delamination of the coating 111 can be suppressed, but the coating having lubricity has to be applied to the surface of the first steel component 11, so that not only the production cost increases but also the coating having lubricity is removed at the time of press fitting and mixed into the second steel component 12 and/or the third component 13, which may lead to contamination.

On the other hand, the surface of the second steel component 12 subjected to the quenching treatment is hard and has high wear resistance, but the impact strength (toughness) is low. To achieve both the wear resistance and the impact strength, a tempering treatment may be carried out to keep the second steel component 12 at a relatively low temperature of about 150-220° C. In this case, the α-martensite structure can be changed to a β-martensite structure having a relatively low carbon concentration to improve the toughness. However, this reaction requires a long time because the transformation from the α-martensite structure to the β-martensite structure, which occurs in the tempering treatment, is a diffusion and aggregation phenomenon of carbon. Thus, a problem arises in that the treatment time is prolonged.

In the present embodiment, therefore, a dedicated tempering treatment is not performed, and the first steel component 11 and the second steel component 12 are fitted together by shrink fitting rather than press fitting. Then, in consideration of the fact that the shrink fitting requires a temperature difference ΔT between the first steel component 11 and the second steel component 12, the second steel component 12 is heated to a first temperature $T_1$ that is equal to or higher than a tempering temperature $T_0$ of the second steel component 12 and higher than a temperature of the first steel component 11 by the temperature difference ΔT for achieving the shrink fitting. For example, when the tempering temperature of the second steel component 12 is equal to or higher than 150° C. (but equal to or lower than an $A_1$ transformation temperature of 730° C.), the temperature of the first steel component 11 is a room temperature of 20° C., and the temperature difference ΔT required for the second steel component 12 to be shrink-fitted with the first steel component 11 is 260° C., the second steel component 12 is heated to 280° C. When the temperature difference ΔT required for the second steel component 12 to be shrink-fitted with the first steel component 11 is a large difference such as 340° C., for example, the second steel component 12 is heated to 280° C. and the first steel component 11 is cooled to −50° C.

Figure 4:
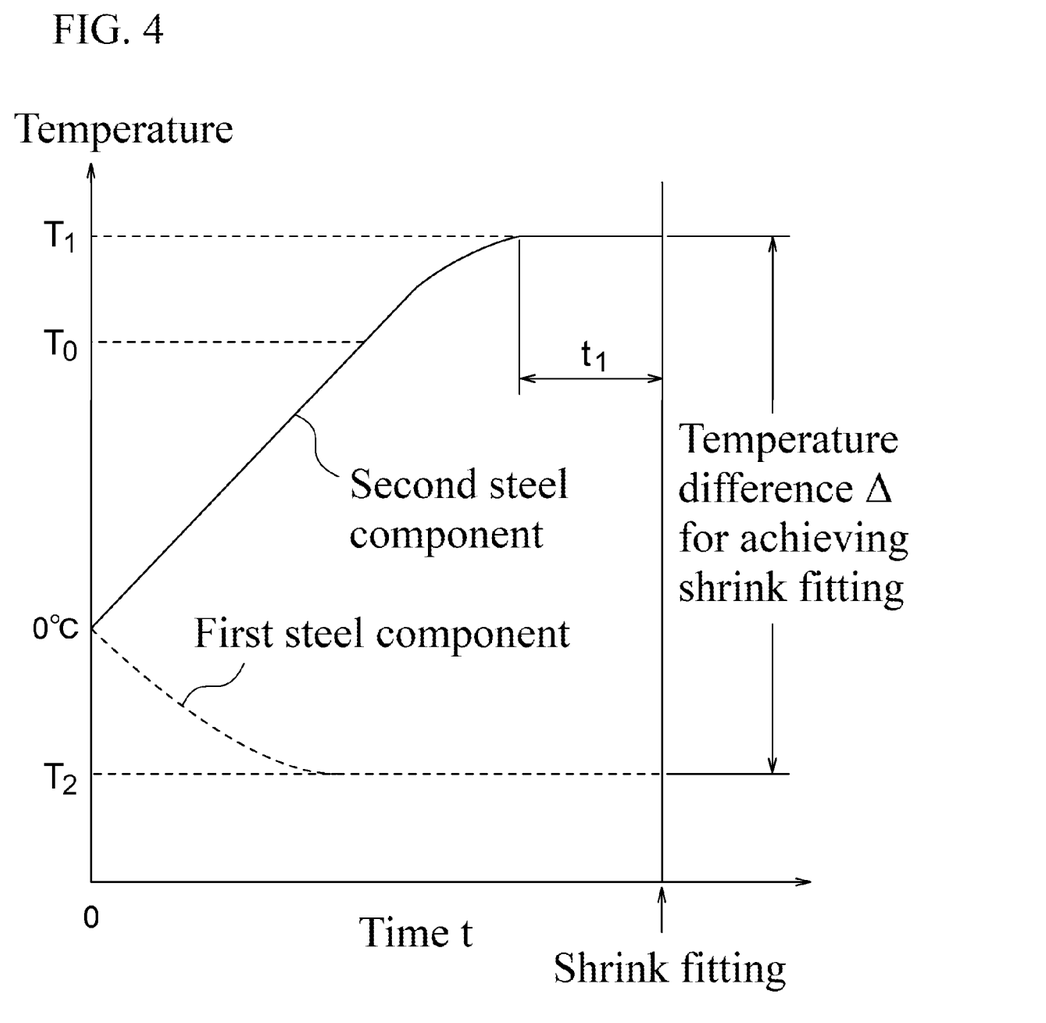
FIG. 4 is a graph illustrating a temperature condition for components to be heat-treated in an embodiment of the heat treatment method and assembly method for a fitted component according to the present invention.

Thus, the heating temperature (first temperature $T_1$) of the second steel component 12 in the shrink-fitting step as illustrated in FIG. 1 is the first temperature $T_1$ that is equal to or higher than the tempering temperature $T_0$ of the second steel component 12 and higher than the temperature of the first steel component 11 by the temperature difference ΔT for achieving the shrink fitting. Here, the temperature difference ΔT for achieving the shrink fitting between the first steel component 11 and the second steel component 12 depends on the predetermined fitting dimensions of the outer diameter dimension of the first steel component 11 and the inner diameter dimension of the first holes. When the temperature difference ΔT is relatively small, therefore, the second steel component 12 is heated while the first steel component 11 can be in a room temperature state, but when the temperature difference ΔT is large, as illustrated in FIG. 4, the second steel component 12 is heated to the first temperature $T_1$ equal to or higher than the tempering temperature $T_0$ and the first steel component 11 is cooled to a second temperature $T_2$ thereby to ensure the temperature difference ΔT for achieving the shrink fitting. FIG. 4 is a graph illustrating a temperature condition for the first steel component 11 and the second steel component 12 to be heat-treated in the present embodiment.

Then, in a state of maintaining the temperature difference ΔT for achieving the shrink fitting between the first steel component 11 and the second steel component 12, the first steel component 11 is shrink-fitted in the first holes 123 and 124 of the second steel component 12. In this operation, a time t1 illustrated in FIG. 4 is provided to ensure the tempering time. It is preferred to perform the shrink fitting immediately after heating the second steel component 12 to the first temperature $T_1$ and cooling the first steel component 11 to the second temperature $T_2$, but it may often be difficult to do so in an actual line. It is therefore preferred to maintain each of the temperatures $T_1$ and $T_2$ until the shrink fitting so that the temperature difference ΔT can be ensured at least during the shrink fitting.

Figure 3:
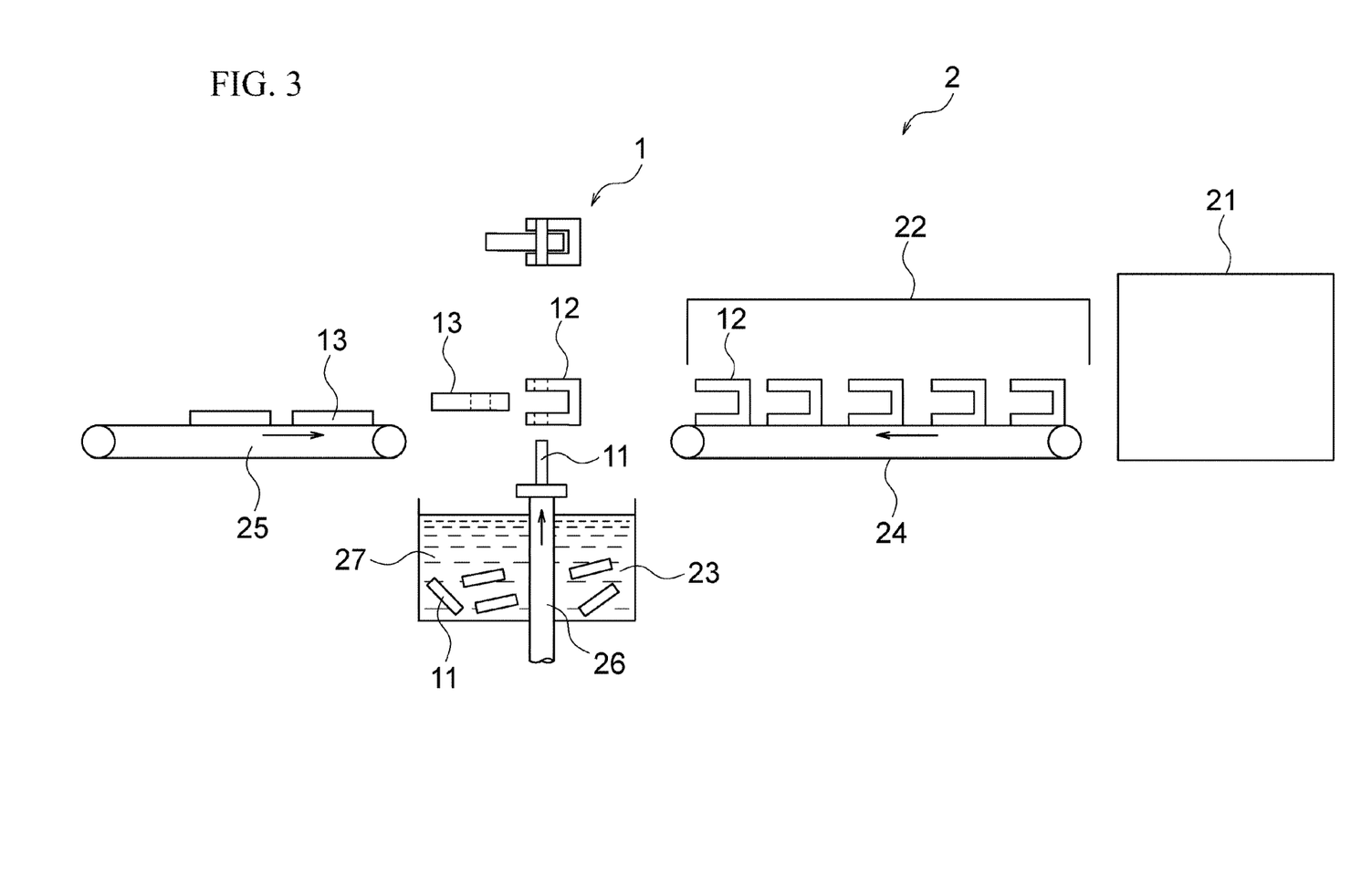
FIG. 3 is a side view of a process representing an embodiment of the heat treatment method and assembly method for a fitted component according to the present invention.

FIG. 3 is a side view illustrating an example in which the process flow illustrated in FIG. 1 is developed as an actual line. A heating furnace 21 for the second steel components 12, a heat-retaining furnace 22 and a conveying apparatus 24 for the second steel components 12, a cooling bath 23 and a shrink-fitting apparatus 26 for the first steel components 11, and a conveying apparatus 25 for the third components 13 are arranged in this order from the right side of the figure. The heating furnace 21 for the second steel components 12, which is a furnace including a high-frequency heating coil, for example, heats the second steel components 12 to the first temperature $T_1$. The heat-retaining furnace 22 for the second steel components 12, which is a tunnel-like furnace covered with a heating insulating material, for example, maintains the second steel components 12 at the first temperature $T_1$ or a temperature slightly lower than the first temperature $T_1$ and ensures the tempering time for the second steel components 12 through ensuring the time t1 required for the second steel components 12 to be conveyed to the shrink-fitting step by the conveying apparatus 24.

The cooling bath 23 for the first steel components 11 is filled with liquid nitrogen 27, for example, and the first steel components 11 are immersed in the liquid nitrogen 27 thereby to be cooled to the second temperature $T_2$. The conveying apparatus 25 conveys the third components 13 to the shrink-fitting step. Then, in the shrink-fitting step, the shrink-fitting apparatus 26 (including a robot (not illustrated)) operates to insert each third component 13 between the pair of wall parts of each second steel component 12 while grasping the first steel component 11, second steel component 12, and third component 13 and insert the first steel component 11 in the second hole 131 when shrink-fitting the first steel component 11 in the first holes 123 and 124 of the second steel component 12. The fitted component 1 thus assembled is delivered to the next step by a conveying apparatus (not illustrated).

Figure 5:
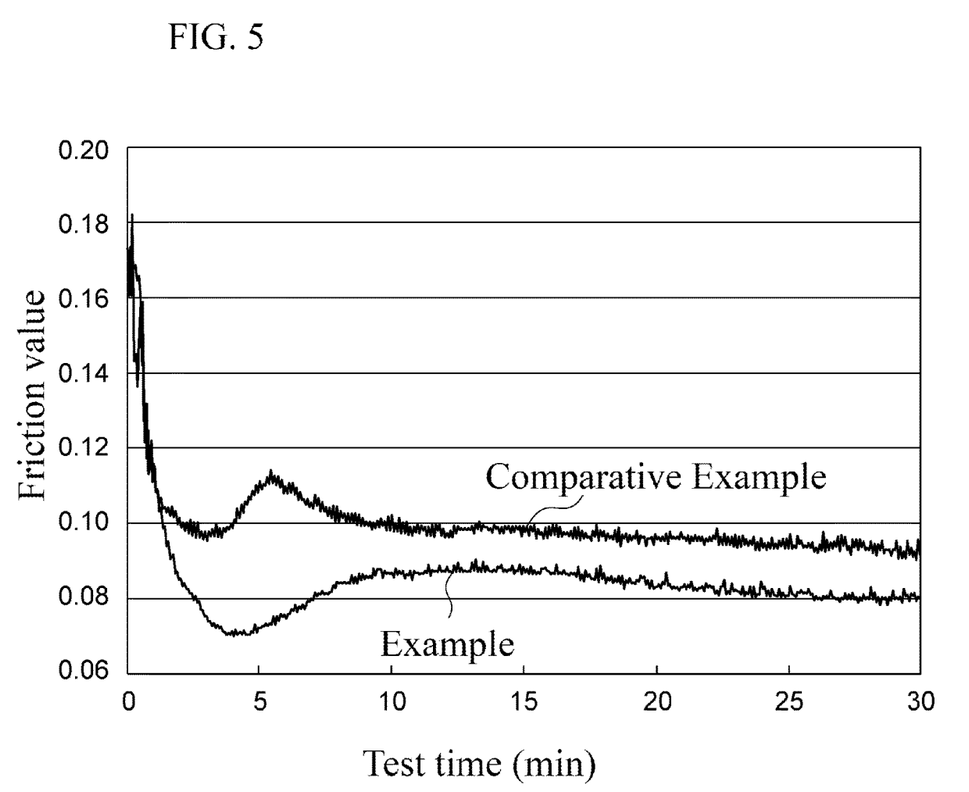
FIG. 5 is a graph obtained by evaluating the surface condition of the heat-treated and assembled component in the embodiment of FIGS. 1 to 4.

FIG. 5 is a graph obtained by evaluating the surface condition of the heat-treated and assembled component in the present embodiment. "Example" represents the result of measurement in which the first steel component 11 was cut out from the fitted component 1 assembled in the heat treatment step as illustrated in FIG. 1 and the friction resistance of the coating 111 portion of the first steel component 11 was measured using a vibration frictional wear tester. On the other hand, "Comparative Example" represents the result of measurement in which the second steel component 12 was subjected to a tempering treatment of 180° C.×70 min instead of the tempering step illustrated in FIG. 1 and the first steel component 11 was press-fitted into the second steel component 12. The friction resistance of the coating 111 of the first steel component 11 in "Example" is apparently smaller than that in "Comparative Example."

Figure 6:
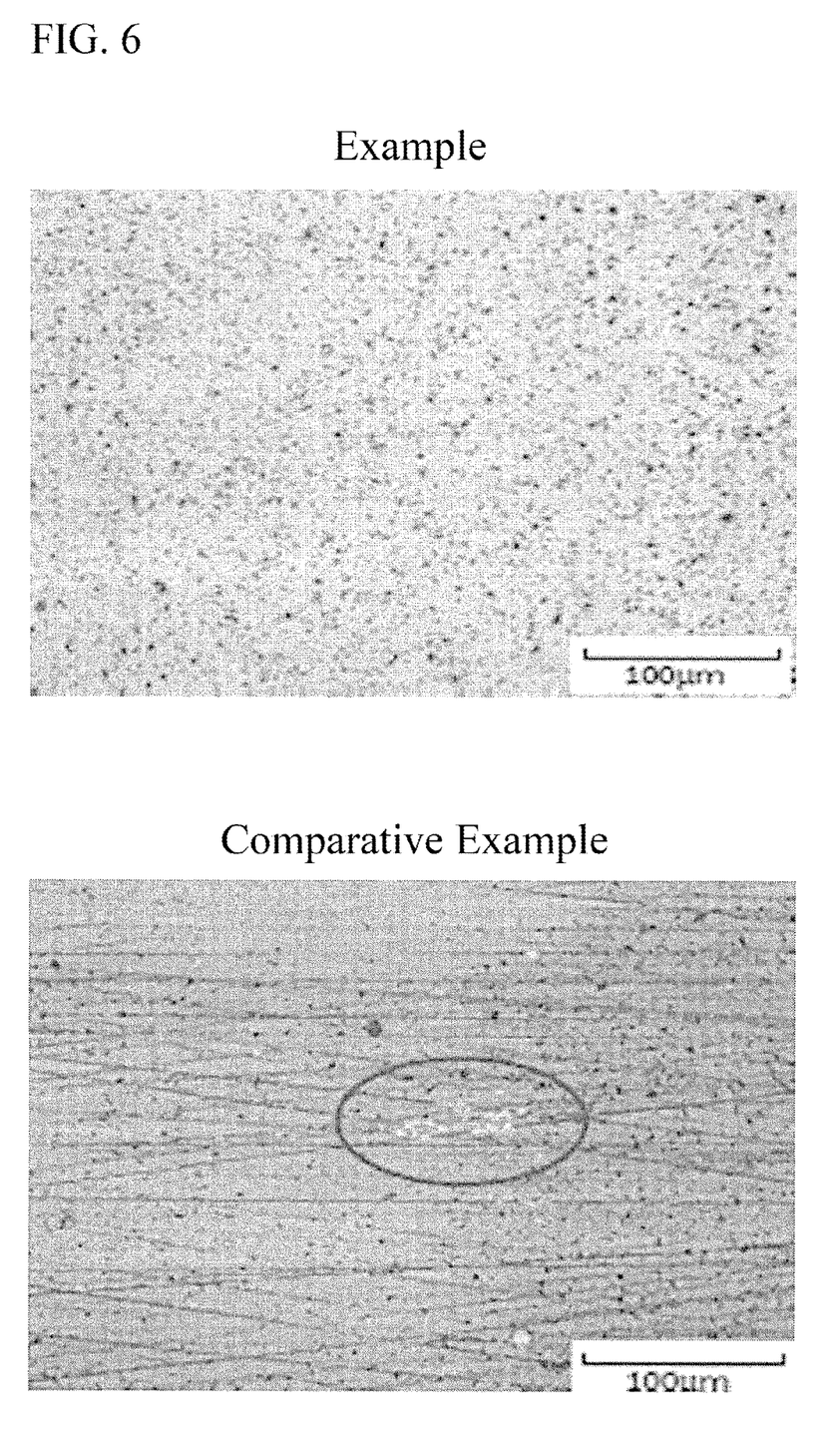
FIG. 6 is a set of photomicrographs obtained by evaluating the surface condition of the heat-treated and assembled component in the embodiment of FIGS. 1 to 4.

FIG. 6 is a set of photomicrographs obtained by evaluating the surface condition of the heat-treated and assembled component in the present embodiment when observing the surfaces of "Example" and "Comparative Example" produced for the measurement illustrated in FIG. 5. In "Comparative Example," streaks and delamination (portion marked with the oval) were observed on the surface, but in "Example," no streaks and delamination were observed on the surface.

As described above, according to the heat treatment method or assembly method for a fitted component of the present embodiment, the first steel component 11 is shrink-fitted in the first holes 123 and 124 of the second steel component 12 in a state of maintaining the temperature difference $\Delta T$ for achieving the shrink fitting between the first steel component 11 and the second steel component 12 and gaps are therefore formed between the first steel component 11 and the first holes 123 and 124. As a result, delamination of the coating 111 formed on the first steel component 11 can be suppressed. In addition to this, the tempering treatment can be performed without providing a dedicated tempering step because, for the shrink fitting, the second steel component 12 is heated to a temperature equal to or higher than the tempering temperature $T_0$. As a result, both the wear resistance and the impact strength of the second steel component 12 can be improved.

Moreover, according to the heat treatment method or assembly method for a fitted component of the present embodiment, the first steel component 11 is cooled to the second temperature $T_2$ to ensure the temperature difference $\Delta T$ for achieving the shrink fitting between the first steel component 11 and the second steel component 12. Therefore, even under the fitting condition in which the temperature difference $\Delta T$ is large, the heat treatment can be performed without heating the second steel component 12 to the $A_1$ transformation temperature of 730° C.

Furthermore, according to the heat treatment method or assembly method for a fitted component of the present embodiment, after the first steel component 11 is cooled to the second temperature $T_2$, the first steel component 11 is carried to the shrink-fitting step while keeping the temperature of the first steel component 11, and/or after the second steel component 12 is heated to the first temperature $T_1$, the second steel component 12 is carried to the shrink-fitting step while keeping the temperature of the second steel component 12. This can ensure the temperature difference $\Delta T$ for achieving the shrink fitting and can also ensure the tempering time.

DESCRIPTION OF REFERENCE NUMERALS

1 Fitted component
   11 First steel component
      111 Coating
   12 Second steel component
      121, 122 Wall part
      123, 124 First hole
      125 Base part
   13 Third component
      131 Second hole
2 Shrink-fitting step
   21 Heating furnace
   22 Heat-retaining furnace
   23 Cooling bath
   24, 25 Conveying apparatus
   26 Shrink-fitting apparatus
   27 Liquid nitrogen
$T_0$ Tempering temperature
$T_1$ First temperature
$T_2$ Second temperature
$\Delta T$ Temperature difference for achieving shrink fitting

The invention claimed is:

1. A heat treatment method for a fitted component comprising:
   a heating step of heating a second steel component to a first temperature equal to or higher than a tempering temperature of the second steel component, the first temperature being higher than a temperature of a first steel component by a temperature difference for achieving shrink fitting, the first steel component being formed with a coating thereon, the second steel component subjected to a quenching treatment being formed with a first hole; and
   a shrink-fitting step of, in a state of maintaining the temperature difference for achieving shrink fitting between the first steel component and the second steel component, inserting the first steel component into the first hole so that the coating passes through the first hole, inserting the first steel component into a second hole of a third component so that the coating is in sliding contact with the second hole, and shrink-fitting a part of the first steel component other than a part where the coating is formed in the first hole.

2. The heat treatment method for a fitted component according to claim 1, further comprising
a cooling step of cooling the first steel component to a second temperature in order to obtain the temperature difference for achieving shrink fitting between the first steel component and the second steel component.

3. The heat treatment method for a fitted component according to claim 2, wherein after the first steel component is cooled to the second temperature, the first steel component is carried to the shrink-fitting step while keeping the temperature of the first steel component.

4. The heat treatment method for a fitted component according to claim 1, wherein after the second steel component is heated to the first temperature, the second steel component is carried to the shrink-fitting step while keeping the temperature of the second steel component.

5. The heat treatment method for a fitted component according to claim 1, wherein the second steel component has a pair of wall parts formed with respective first holes and provided to stand with a space therebetween, and
in the shrink-fitting step, a third component formed with a second hole into which the first steel component is to be inserted is inserted between the pair of wall parts and the first steel component is inserted into the second hole when the first steel component is shrink-fitted in the first holes of the second steel component, wherein the second hole is in sliding contact with the coating.

6. An assembly method for a fitted component comprising:
a heating step of heating a second steel component to a first temperature equal to or higher than a tempering temperature of the second steel component, the first temperature being higher than a temperature of a first steel component by a temperature difference for achieving shrink fitting, the first steel component being formed with a coating thereon, the second steel component subjected to a quenching treatment being formed with a first hole; and
a shrink-fitting step of, in the first hole in a state of maintaining the temperature difference for achieving shrink fitting between the first steel component and the second steel component, inserting the first steel component into the first hole so that the coating passes through the first hole, inserting the first steel component into a second hole of a third component so that the coating is in sliding contact with the second hole, and shrink-fitting a part of the first steel component other than a part where the coating is formed in the first hole.

7. The assembly method for a fitted component according to claim 6, further comprising
a cooling step of cooling the first steel component to a second temperature in order to obtain the temperature difference for achieving shrink fitting between the first steel component and the second steel component.

8. The assembly method for a fitted component according to claim 7, wherein after the first steel component is cooled to the second temperature, the first steel component is carried to the shrink-fitting step while keeping the temperature of the first steel component.

9. The assembly method for a fitted component according to claim 6, wherein after the second steel component is heated to the first temperature, the second steel component is carried to the shrink-fitting step while keeping the temperature of the second steel component.

10. The assembly method for a fitted component according to claim 6, wherein the second steel component has a pair of wall parts formed with respective first holes and provided to stand with a space therebetween, and
in the shrink-fitting step, a third component formed with a second hole into which the first steel component is to be inserted is inserted between the pair of wall parts and the first steel component is inserted into the second hole when the first steel component is shrink-fitted in the first holes of the second steel component, wherein the second hole is in sliding contact with the coating.

\* \* \* \* \*